(12) United States Patent
Hsu

(10) Patent No.: US 8,730,688 B2
(45) Date of Patent: May 20, 2014

(54) FLYBACK POWER CONVERTER WITH MULTIPLE OUTPUTS AND A SECONDARY SIDE POST REGULATOR THEREOF

(75) Inventor: Ta-Ching Hsu, Taipei (TW)

(73) Assignee: Niko Semiconductor Co., Ltd., New Taipei (TW)

( * ) Notice: Subject to any disclaimer, the term of this patent is extended or adjusted under 35 U.S.C. 154(b) by 402 days.

(21) Appl. No.: 13/153,235

(22) Filed: Jun. 3, 2011

(65) Prior Publication Data

US 2011/0310639 A1    Dec. 22, 2011

(30) Foreign Application Priority Data

Jun. 21, 2010    (TW) ............................... 99120152 A

(51) Int. Cl.
*H02M 3/335*    (2006.01)
(52) U.S. Cl.
USPC .................................... 363/21.14; 363/21.18
(58) Field of Classification Search
CPC ..................... H02M 3/33561; H02M 3/33592
USPC ......... 363/20, 21.01, 21.12, 21.14, 21.18, 95, 363/97, 131
See application file for complete search history.

(56) References Cited

U.S. PATENT DOCUMENTS

| | | | |
|---|---|---|---|
| 6,459,595 B2 * | 10/2002 | Assow | 363/21.14 |
| 6,987,679 B2 * | 1/2006 | Gan et al. | 363/89 |
| 7,679,937 B2 * | 3/2010 | Wingrove et al. | 363/21.12 |
| 7,791,903 B2 * | 9/2010 | Zhang et al. | 363/16 |
| 7,889,521 B2 * | 2/2011 | Hsu | 363/21.14 |

* cited by examiner

*Primary Examiner* — Matthew Nguyen
(74) *Attorney, Agent, or Firm* — Li & Cai Intellectual Property (USA) Office

(57) ABSTRACT

A flyback power converter with multiple outputs is disclosed. The flyback power converter has a transformer, a first output circuit, a second output circuit, and a secondary side synchronous rectification controller. The transformer has a primary side winding, a first output winding, and a second output winding. The first output circuit has a first output capacitor for storing electric energy from the first output winding. The second output circuit has a second rectifying switch and a second output capacitor. The second output capacitor is utilized for storing the electric energy from the second output winding. The secondary side synchronous rectification controller controls the conduction time of the second rectifying switch according to a detecting signal of a secondary-side conduction period. The electric energy in the first output capacitor may be transferred to the second output capacitor through the second output winding and the second rectifying switch and vice versa.

18 Claims, 6 Drawing Sheets

US 8,730,688 B2

FLYBACK POWER CONVERTER WITH MULTIPLE OUTPUTS AND A SECONDARY SIDE POST REGULATOR THEREOF

BACKGROUND OF THE INVENTION

1. Field of the Invention

The present invention relates to a flyback power converter with multiple outputs; in particular, to a multiple-outputs flyback power converter with a secondary side post regulator.

2. Description of Related Art

Low power converters with multiple outputs have been widely applied to a variety of electronic products such as monitors, mini PC, set-up box (STB), video and music player, game console, etc. Meanwhile, because of the soaring oil price and the increasing awareness of environmental protection, numerous energy-preserving measures have been rolling out.

For the purpose of output voltage regulation, the traditional method is to connect power resistors as dummy loads to each output terminal so that the output terminal may operate with the sufficient load and to have multiple output feedback arranged to stabilize the output signals. Another method is to incorporate linear voltage regulators to achieve the goal of regulating the output voltage at the output terminals other than the main output terminal. However, attending with the awareness of environmental protection, these methods cannot fulfill the demand of power efficiency.

FIG. 1 shows a flyback power converter with multiple outputs utilizing a linear regulator for stabilizing output voltage. Primary side of the flyback application circuit has a pulse width modulation (PWM) controller 11 and a power transistor 12. Secondary side of the flyback application circuit has a main output circuit and a secondary output circuit. Each output circuit has an output terminal VO1 or VO2 for outputting an output voltage. The PWM controller 11 on the primary side detects a voltage level of the main output terminal VO1 on the secondary side through a feedback device 13, and accordingly controls conduction time of the power transistor 12 so as to adjust electric energy stored in the primary side winding 140 of the transformer 14 from the power supplying terminal VIN. A voltage level of the main output terminal VO1 is thus controlled by the feedback circuit.

When the main output circuit utilizes the feedback device to regulate the voltage level of the output voltage, the second output circuit employs a linear regulator 22 to regulate a voltage level of the second output terminal VO2. However, limited by operations of the linear voltage regulator 22, a winding voltage provided by the second output winding 142 of the voltage converter 14 must be higher than the predetermined output voltage of the second output circuit to ensure the voltage level of the second output terminal VO2 could be in compliance with prevailing standards. The high winding voltage causes the increasing power consumption of the linear regulator 22.

Accordingly, how to offer stable multiple output voltages and reduce the power consumption at the same time is a problem to be addressed.

SUMMARY OF THE INVENTION

The main object of the present invention is to provide a method for stabilizing output voltages at each output terminal other than the main output modulated with feedback control.

Another main object of the invention is to provide a method for solving the shortcoming of high power consumption associated with the power converter with multiple outputs.

In order to achieve the aforementioned objects, according to an embodiment of the present invention, a flyback power converter with multiple outputs is disclosed. The flyback power converter with multiple inputs includes a transformer, a first output circuit, a second output circuit, and a secondary side synchronous rectification controller. The transformer has a primary side winding, a first output winding and a second output winding. The first output circuit has a first output capacitor for storing electric energy from the first output winding. The second output circuit has a second rectifying switch and a second output capacitor. The second rectifying switch is connected between the first output capacitor and the second output capacitor. The second output capacitor is used for storing electric energy from the second output winding. The secondary side synchronous rectification controller controls conduction time of the second rectifying switch according to a detecting signal indicative of a secondary side conduction period. Thus, the electric energy is transferred between the first output capacitor and the second output capacitor through the second output winding and the second rectifying switch.

According to aforementioned flyback power converter with multiple outputs, the present invention also offers a secondary side regulation controlling circuit. The secondary side regulation controlling circuit includes a second rectifying circuit and a secondary side synchronous rectification controller. The second rectifying switch is connected between aforementioned first output capacitor and second output capacitor. The secondary side synchronous rectification controller controls the conduction time of the second rectifying switch according to the detecting signal indicative of the secondary side conduction period for having the electric energy transferred between the first output capacitor and the second output capacitor.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 2:
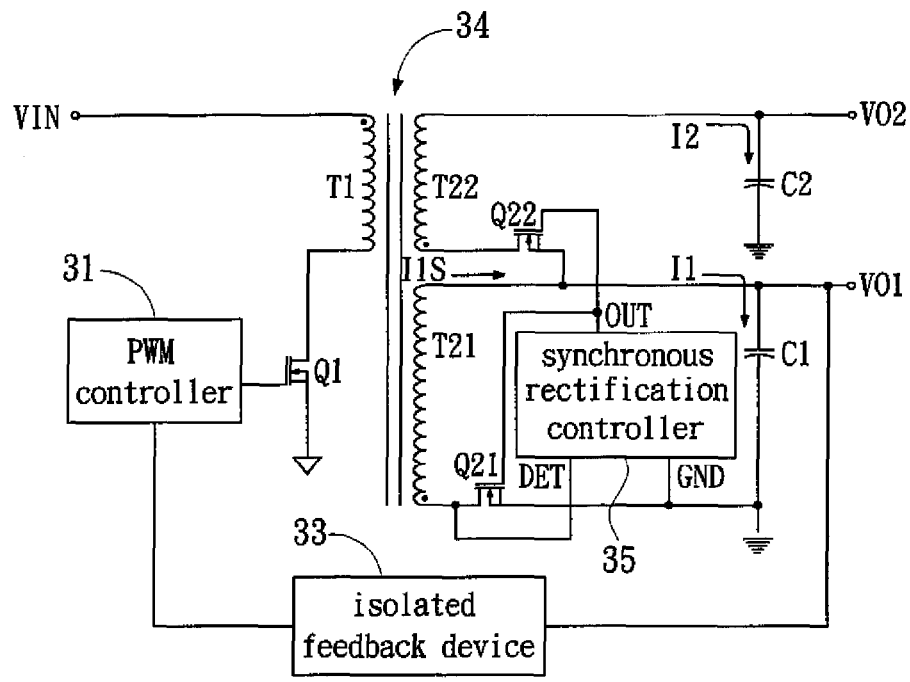
FIG. 2 shows a circuit diagram of a flyback power converter with multiple outputs according to a first embodiment of the present invention.

FIG. 2 shows a circuit diagram of a flyback power converter with multiple outputs according to a first embodiment of the present invention. The flyback power converter has a transformer 34, a first output circuit, a second output circuit, and a secondary side synchronous rectification controller 35. The transformer 34 has a primary side winding T1, a first output winding T21, and a second output winding T22, in order to generate two winding voltages provided to the first output circuit and the second output circuit, respectively. The primary side winding is connected to a power supply terminal VIN. The first output circuit is connected to the first output winding T21, and has a main output terminal VO1 for outputting a first output voltage. The second output circuit is connected to the second output winding T22, and has a second output terminal VO2 for outputting a second output voltage.

As shown in the figure, the first output circuit has a first rectifying switch Q21 and a first output capacitor C1. The first rectifying switch Q21 may be a power transistor or other rectifying elements. Electric energy supplied by the power supply terminal VIN is stored in the first output winding T21 through the transformer 34. The electric energy stored in the first output winding T21 is released to a load through the main output terminal VO1 and also stored in the first output capacitor C1. The second output circuit has a second rectifying switch Q22 and a second output capacitor C2. The second rectifying switch Q22 may be a power transistor or other controllable switching element.

In this embodiment, one terminal of the second rectifying switch Q22 is connected to the second output winding T22, and another terminal thereof is connected to a high voltage terminal of the first output capacitor C1. One terminal of the first rectifying switch Q21 is connected to the first output winding T21, and another terminal thereof is connected to a grounding terminal. Electric energy stored in the first output capacitor C1 may be transferred to the second output capacitor C2 through the second rectifying switch Q22 and the second output winding T22 and vice versa.

The secondary side synchronous rectification controller 35 has a detecting terminal DET for retrieving a detecting signal indicative of a secondary-side conduction period. According to the detecting signal, the secondary side synchronous rectification controller 35 may generate a driving signal OUT for controlling the conduction time of the aforementioned first rectifying switch Q21 and the second rectifying switch Q22 synchronously. The detecting signal may be a terminal voltage of the first rectifying switch Q21, a current flowing through the first rectifying switch Q21, or an output current of the first output winding T21. A detecting terminal of the secondary side synchronous rectification controller 35 in this embodiment is coupled to a circuitry between the first output winding T21 and the first rectifying switch Q21, in order to detect the terminal voltage of the first rectifying switch Q21.

The flyback power converter with multiple outputs also has a feedback circuit. The feedback circuit is implemented by a pulse width modulation (PWM) controller 31 on the primary side and an isolated feedback device 33. The PWM controller 31 detects a voltage level of the first output voltage outputted from the main output terminal VO1 through the isolated feedback device 33. According to the voltage level of the first output voltage, the PWM controller 31 controls the conduction time of the power transistor Q1 which is connected to the primary side winding T1 so as to adjust amount of the electric energy from the power supply terminal VIN stored in the transformer 34. In this embodiment, the PWM controller 31 controls the amount of the electric energy stored in the primary side winding T1 according to the voltage level of the first output voltage. In another implementation, the PWM controller 31 may detect voltage levels of the main output terminal VO1 of the first output circuit and the second output terminal VO2 of the second output circuit so as to control the amount of electric energy stored in the primary side winding T1.

The secondary side synchronous rectification controller 35 of this embodiment verifies the timing when the transformer 34 begins to release electric energy and the end of that particular release of electric energy through the detecting signal of the secondary-side conduction period in order to control the conduction times of the first rectifying switch Q21 and the second rectifying switch Q22. Besides, as shown in the FIG. 2, a current IS1 flowing through the first switching element Q21 is equal to the sum of a first output current I1 and a second output current I2. Regardless of the variations in the first output current I1 and/or the second output current I2, the PWM controller 31 may properly control the conduction time of the power transistor Q1 on the primary side through the isolated feedback device 33, in order to effectively regulate outputted voltages.

Despite this embodiment takes the flyback power converter with two outputs as an example to illustrate the invention, the present invention is not restricted thereto. More specifically, the present invention is directed to detecting the output current of the main output winding (such as the first output winding T21) to synchronously control the conduction time of the rectifying switches of the other output circuits so as to have the electric energy stored in the output capacitors of each output circuit shared with each other in terms of current.

Figure 6:
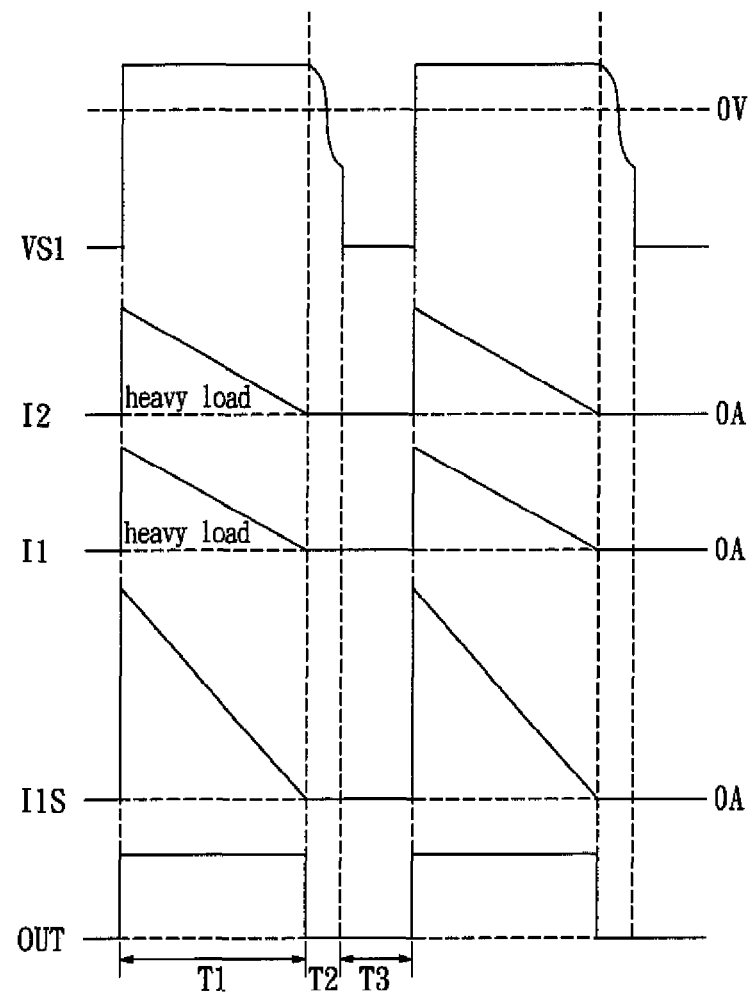
FIG. 6 shows waveforms of signals of the flyback power converter with multiple outputs when both output terminals are heavily loaded according to the present invention.

FIG. 6 illustrates a diagram showing the waveforms of the above mentioned signals of a flyback power converter with multiple outputs of the FIG. 2 when the main output terminal VO1 and the second output terminal VO2 are heavily loaded. The waveforms of the first output winding VS1, the second output current I2 (i.e. electric current flowing through the second rectifying switch Q22), the first output current I1, the first synchronous rectifying switch current I1S, and the driving signal OUT outputted from the secondary side synchronous rectification controller 35 are shown. It is worth noting that the first synchronous rectifying switch current I1S refers to the current flowing through the first rectifying switch Q21, and the first output current I1 refers to the current flowing into the first output capacitor C1.

The operation of the flyback power converter with multiple outputs may be divided into three periods, which are T1, T2 and T3. T1 is the conduction period of the secondary side, T2 is the ringing period, and T3 is the conduction period of the primary side. Please refer to FIG. 6 and FIG. 2 at the same time, in the conduction period of the secondary side T1, the power transistor Q1 on the primary side is turned off and the driving signal OUT of the secondary side synchronous rectification controller 35 is shifted to a "high" voltage level for conducting the first rectifying switch Q21 and the second rectifying switch Q22. At the moment, the electric energy stored in the transformer 34 begins to be released to the first output capacitor C1 and the second output capacitor C2 through the first output winding T21 and the second output winding T22, respectively. The current flowing through the first rectifying switch I1S is equal to the sum of the second output current I2 and the first output current I1.

At the end of the conduction period of the secondary side T1, (i.e. when the first synchronous rectifying switch current I1S becomes zero), the driving signal OUT of the secondary side synchronous rectification controller 35 is changed to a "low" voltage level to turn off the first rectifying switch Q21 and the second rectifying switch Q22. Meanwhile, resonance involving the transformer and the capacitors occurs and the ringing period T2 begins. Thereafter, the power transistor Q1 on the primary side is turned on again and the conduction period of the primary side T3 begins. At the moment, the electric energy is stored in the primary side winding T1 of the transformer 34 before the start of the next conduction period of the secondary side T1.

Figure 7:
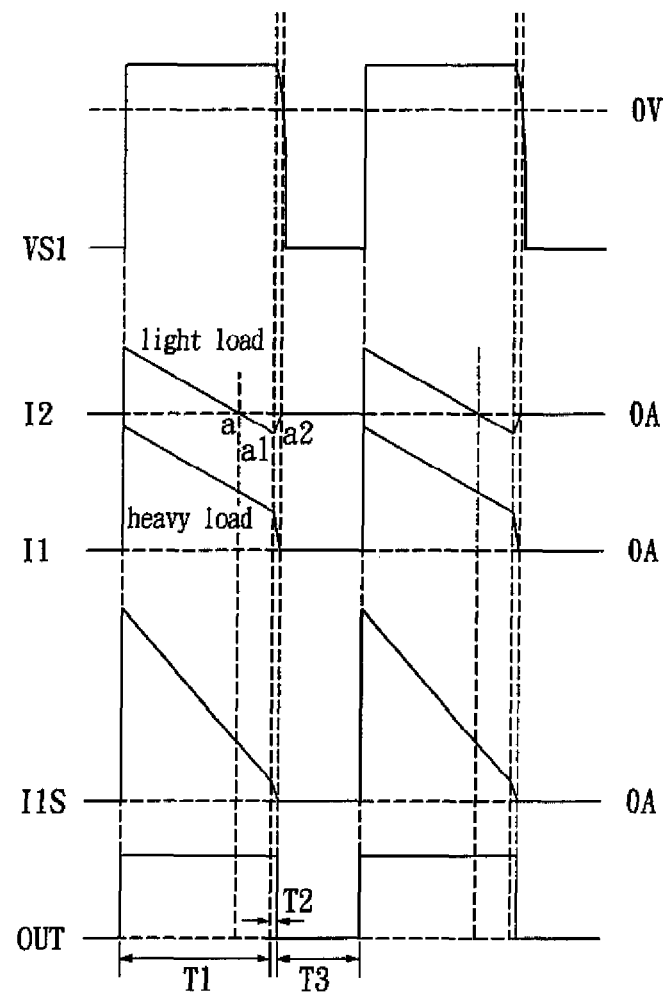
FIG. 7 shows waveforms of signals of the flyback power converter with multiple outputs as the main output terminal is heavily loaded and the second output terminal is lightly loaded according to the present invention.

FIG. 7 shows a diagram of the waveforms of the signals in the flyback power converter with multiple outputs as the main output terminal VO1 is heavily loaded and the second output terminal VO2 is lightly loaded according to the present invention. The secondary winding voltage VS1, the second output current I2 (i.e. electric current flowing through the second rectifying switch Q22), the first output current I1, the first synchronous rectifying switch current I1S, and the driving signal OUT outputted from the secondary side synchronous rectification controller 35 are shown in this diagram.

Comparing with the embodiment shown in FIG. 6, the second output terminal VO2 in the present embodiment is lightly loaded so as to result in a smaller second output current I2. Thus, as shown in the figure, when the second output current I2 reduces to zero at time point a, the first output current I1 is still positive to charge the first output capacitor C1. Meanwhile, the second rectifying switch Q22 is conducted, and the second output current I2 is reversed to charge the first output capacitor C1 in order to prevent the voltage level at the second output terminal VO2 from increasing. The reversed second output current I2 may be gradually increased from time point a to time point a1. Subsequently, when the reversed second output current I2 is unable to increase any further at time point a1, the second output current I2 would be reduced to zero rapidly and the polarity of the secondary side winding would be reversed. Meanwhile, the second rectifying switch Q22 is turned off. Comparing with the embodiment in FIG. 6, the duration of the ringing period T2 of this embodiment is significantly shortened because of the rapid polarity reverse of the secondary side winding.

Figure 8:
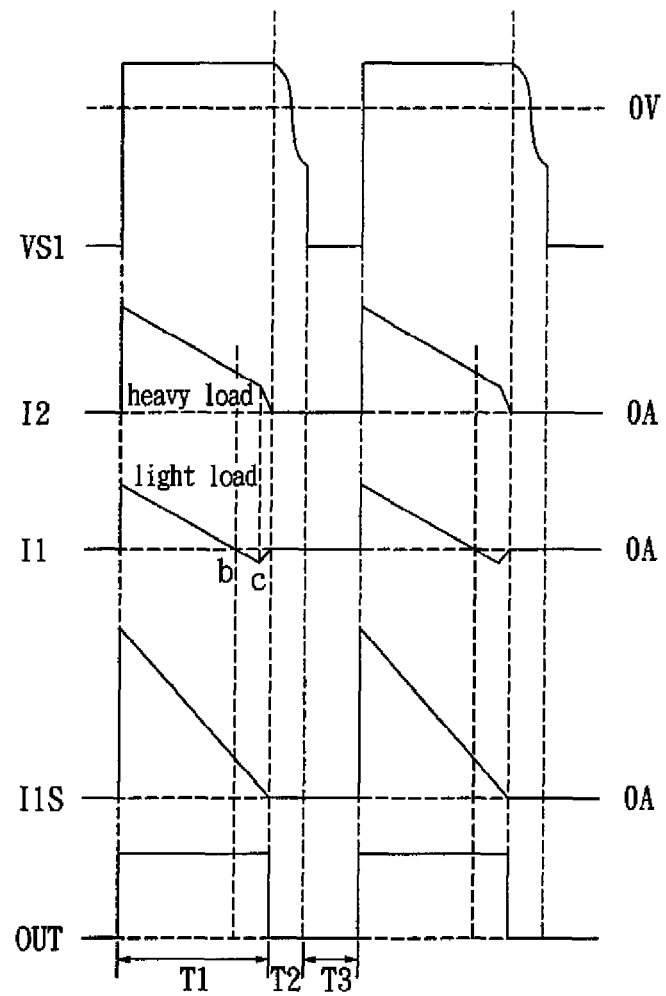
FIG. 8 shows waveforms of signals of the flyback power converter with multiple outputs as the main output terminal is lightly loaded and the second output terminal is heavily loaded according to the present invention.

FIG. 8 shows a diagram of waveforms of signals in the flyback power converter with multiple outputs as the main output terminal VO1 is lightly loaded and the second output terminal VO2 is heavily loaded according to the present invention. The secondary winding voltage VS1, the second output current I2 (i.e. electric current flowing through the second rectifying switch Q22), the first output current I1, the first synchronous rectifying switch current I1S, and the driving signal OUT outputted from the secondary side synchronous rectification controller 35 are shown in this diagram.

Comparing with the embodiment shown in FIG. 6, the main output terminal VO1 of the present embodiment is lightly loaded and the lightly loaded main output terminal VO1 leads to a smaller first output current I1. When the first output current I1 reduces to zero at time point b, the second output current I2 is still positive to charge the second output capacitor C2. Meanwhile, the current flowing through the first rectifying switch Q21 is positive and the second rectifying switch Q22 is still turned on. At this time, the first output current I1 would be reversed to charge the second output capacitor C2 in order to prevent the voltage level at the main output terminal VO1 from excessively increasing and to cause the voltage level at the main output terminal VO1 decrease also. When the voltage level of the main output terminal VO1 falls to a relative low point, the increasing of the first output current I1 cannot be sustained, such that the first output current I1 begins to be reduced at time point c and the second output current I2 is reduced rapidly.

Figure 3:
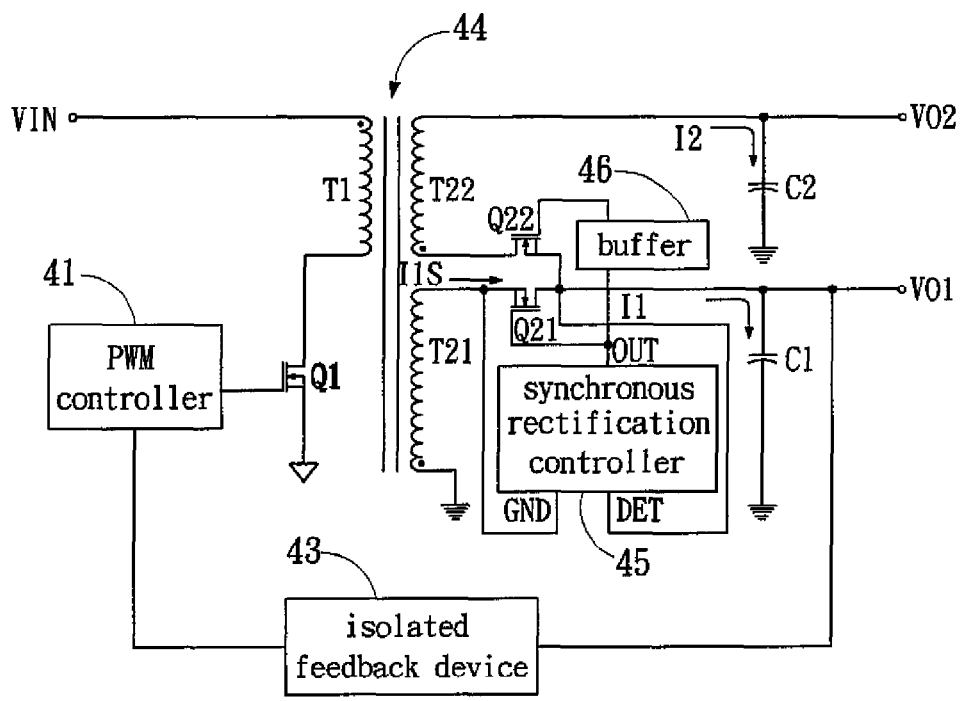
FIG. 3 shows a circuit diagram of a flyback power converter with multiple outputs according to a second embodiment of the present invention.

FIG. 3 shows a circuit diagram of a flyback power converter with multiple outputs according to a second embodiment of the present invention. Different from the first embodiment of the present invention, the first rectifying switch Q21 of this embodiment is located on the circuit between the first output winding T21 of the transformer 44 and the main output terminal VO1. The second output winding T22 is serially connected to the main output terminal VO1 through the second rectifying switch Q22. As such, the electric energy from the second output winding T22 may charge the first output capacitor C1 through the second rectifying switch Q22 without passing through the first rectifying switch Q21.

A major difference between this embodiment and the first embodiment of the present invention is the respective positions of the first rectifying switch Q21 and the first output winding T21. More specifically, in contrast with the first embodiment, the respective positions of the first rectifying switch Q21 and the first output winding T21 is exchanged. Thus, the operation of the power converter in accordance with the present embodiment is similar to that of the first embodiment.

Secondly, since the position of the first rectifying switch Q21 is different when compared with its counterpart in the first embodiment, the locations of the detecting terminal DET and the grounding terminal GND of the secondary side synchronous rectification controller 45 should be changed accordingly. For example, the grounding terminal GND of the secondary side synchronous rectification controller 45 is connected to the output terminal of the first output winding T21 (i.e., a source terminal of the first rectifying switch Q21), and the detecting terminal DET of the secondary side synchronous rectification controller 45 is connected to a drain terminal of the first rectifying switch Q21. Besides, in this embodiment, attending with the variation of the voltage level of the grounding terminal GND of the secondary side synchronous rectification controller 45, a buffer 46 is added between the secondary side synchronous rectification controller 45 and the second rectifying switch Q22, in order to prevent the driving voltage across a gate terminal and a source terminal of the second rectifying switch Q22 from excessively increasing or decreasing.

Figure 4:
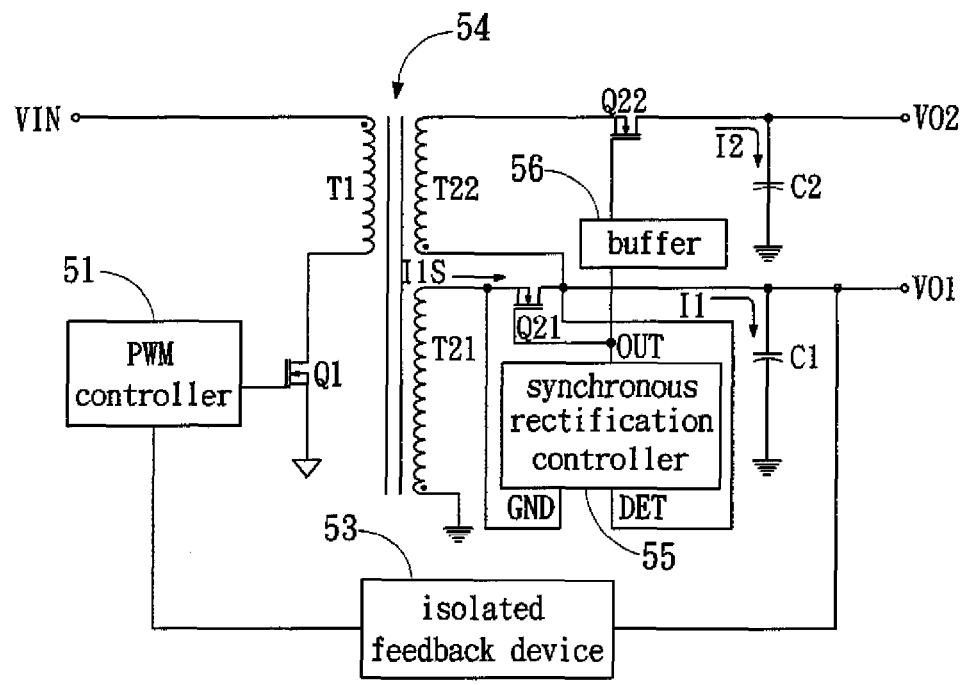
FIG. 4 shows a circuit diagram of a flyback power converter with multiple outputs according to a third embodiment of the present invention.

FIG. 4 shows a circuit diagram of a flyback power converter with multiple outputs according to a third embodiment of the present invention. Different from the second embodiment of the present invention shown in FIG. 3, the second rectifying switch Q22 of this embodiment is located on the circuit between the second output winding T22 of the transformer 54 and the second output terminal VO2. This embodiment differs from the second embodiment of the present invention at the positions of the second rectifying switch Q22 and the second output winding T22. More specifically, it is worth noting that in contrast with second embodiment, the respective positions of the second rectifying switch Q22 and the second output winding T22 are exchanged. Thus, the operation of the power converter in accordance with the present embodiment is similar to that of the second embodiment.

Figure 5:
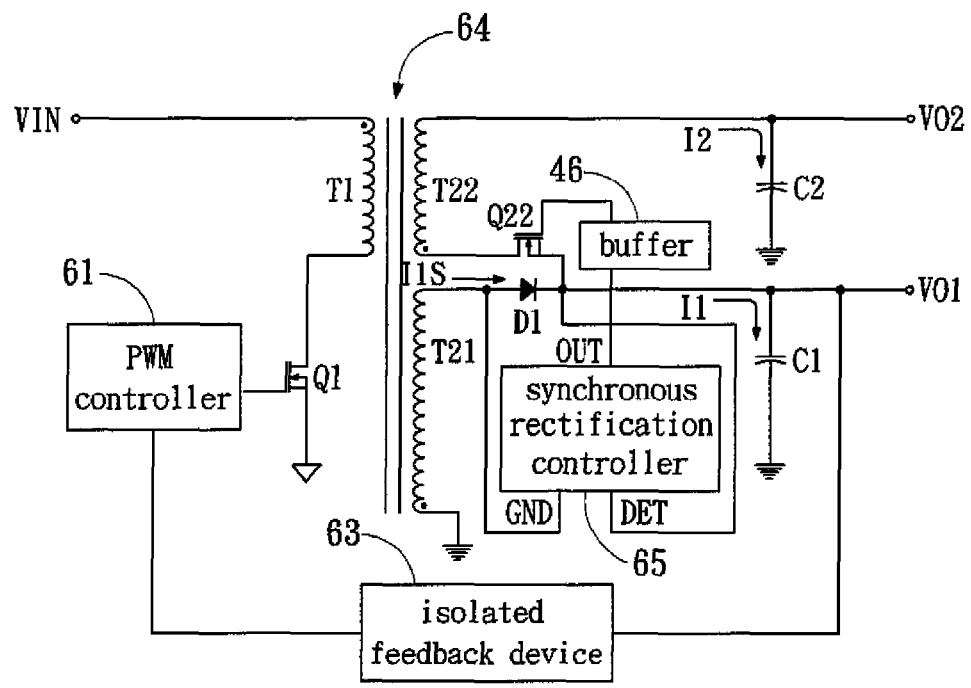
FIG. 5 shows a circuit diagram of a flyback power converter with multiple outputs according to a fourth embodiment of the present invention.

FIG. 5 shows a circuit diagram of a flyback power converter with multiple outputs according to a fourth embodiment of the present invention. Different from the second embodiment of the invention, the first rectifying switch Q21 in FIG. 3 is replaced with a rectifying diode D1 in this embodiment. Thus, the driving signal OUT of the secondary side synchronous rectification controller 65 is only used for controlling the conduction time of the second rectifying switch Q22. The secondary side synchronous rectification controller 65 detects a terminal voltage of the rectifying diode D1 or an electric current flowing through the rectifying diode D1 to determine whether the first output winding T21 still discharges or not so as to control the conduction time of the second rectifying switch 62.

Figure 1:
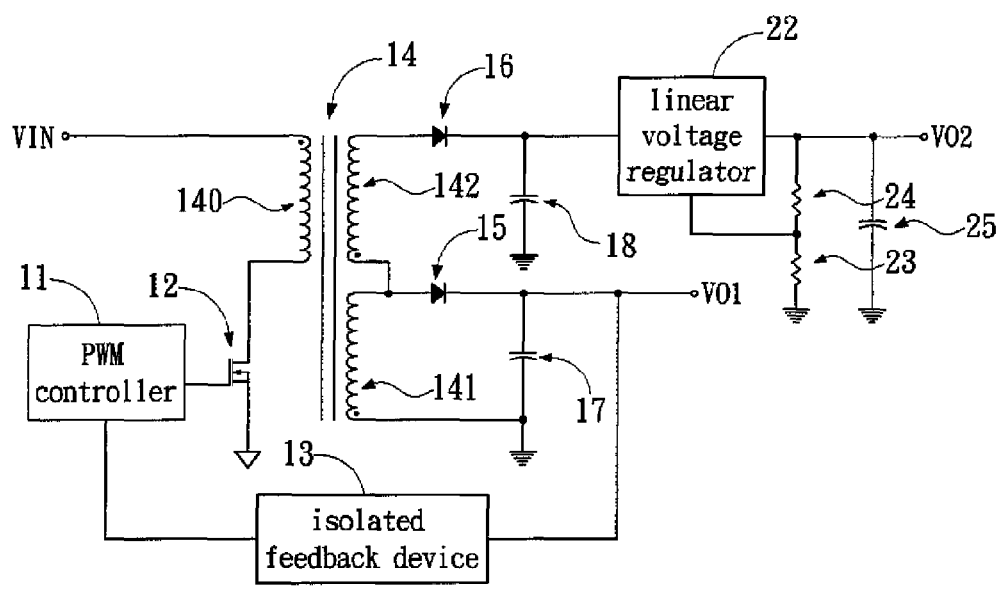
FIG. 1 shows a circuit diagram of a traditional flyback power converter with multiple outputs.

Comparing with the traditional flyback power converters with multiple outputs as shown in FIG. 1, the flyback power converter with multiple outputs according to the present invention is capable of effectively stabilizing the voltage levels of the other output terminals such as the second output terminal VO2 in the absence of the linear voltage regulator 22 in addition to the main output terminal VO1. Further, the flyback power converter with multiple outputs according to the present invention may effectively utilize the electric energy stored in the first output capacitor C1 and the second output capacitor C2, for improving energy efficiency and addressing the concern of instability that takes place in the event of different loading at each output terminal.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A flyback power converter with multiple outputs, comprising:
   a transformer, having a primary side winding, a first output winding and a second output winding;
   a first output circuit, having a first rectifying element and a first output capacitor for storing electric energy from the first output winding;
   a second output circuit, having a second rectifying switch and a second output capacitor for storing electric energy from the second output winding, and the second rectifying switch being connected between the first output capacitor and the second output capacitor; and
   a secondary side synchronous rectification controller, having a detection terminal coupled between the first output winding and the first rectifying element to receive a detecting signal indicative of a secondary-side conduction period, for synchronously controlling a conduction time of the first rectifying element and the second rectifying switch according to a detecting signal indicative of a secondary-side conduction period;
   wherein, electric energy is transferred between the first output capacitor and the second output capacitor through the second output winding and the second rectifying switch.

2. The flyback power converter of multiple outputs according to claim 1, wherein the first rectifying element is a rectifying diode and the electric energy from the first output winding is stored in the first output capacitor through the rectifying diode.

3. The flyback power converter with multiple outputs according to claim 1, wherein the first rectifying element is a first rectifying switch, the electric energy from the first output winding is stored in the first output capacitor through the first rectifying switch, and according to the detecting signal indicative of the secondary-side conduction period.

4. The flyback power converter with multiple outputs according to claim 1, wherein the detecting signal indicative of the secondary-side conduction period is a terminal voltage of the first rectifying element.

5. The flyback power converter with multiple outputs according to claim 1, wherein the detecting signal indicative of the secondary-side conduction period is a current flowing through the first rectifying element.

6. The flyback power converter with multiple outputs according to claim 1, wherein the detecting signal indicative of the secondary-side conduction period is an output current of the first output winding.

7. The flyback power converter with multiple outputs according to claim 1, wherein the secondary side synchronous rectification controller has a grounding terminal connected to an output terminal of the first output winding.

8. The flyback power converter with multiple outputs according to claim 7, further comprising:
   a buffer, through which the secondary side synchronous rectification controller drives the second rectifying switch.

9. The flyback power converter with multiple outputs according to claim 1, further comprising:
   a feedback circuit, for controlling the electric energy stored in the primary side winding according to an output voltage of the first output circuit.

10. The flyback power converter with multiple outputs according to claim 1, further comprising:
    a feedback circuit, for controlling the electric energy stored in the primary side winding according to output voltages of the first output circuit and the second output circuit.

11. A secondary side post regulator applied to a flyback power converter with multiple outputs having a transformer, a first output capacitor and a second output capacitor, the transformer including a primary side winding, a first output winding, and a second output winding, the first output capacitor being connected to the first output winding through a first rectifying element in order to store the electric energy from the first output winding, and the second output capacitor being connected to a second output winding in order to store the electric energy from the second output winding, the secondary side post regulator comprising:
    a second rectifying switch, connected between the first output capacitor and the second output capacitor; and
    a secondary side synchronous rectification controller, having a detection terminal coupled between the first output winding and the first rectifying element to receive a detecting signal indicative of a secondary-side conduction period, for synchronously controlling conduction time of the first rectifying element and the second rectifying switch according to a detecting signal indicative of a secondary-side conduction period;
    wherein, electric energy is transferred between the first output capacitor and the second output capacitor through the second output winding and the second rectifying switch.

12. The secondary side post regulator according to the claim 11, wherein the first rectifying element is a rectifying diode and the electric energy from the first output winding is stored in the first output capacitor through the rectifying diode.

13. The secondary side post regulator according to the claim 11, wherein the detecting signal indicative of the secondary-side conductive period is a terminal voltage of the first rectifying element.

14. The secondary side post regulator according to the claim 11, wherein the detecting signal indicative of the secondary-side conductive period is a current flowing through the first rectifying element.

15. The secondary side post regulator according to the claim 11, wherein the first rectifying element is a first rectifying switch, the electric energy from the first output winding is stored in the first output capacitor through the first rectifying switch.

16. The secondary side post regulator according to the claim 11, wherein the detecting signal indicative of the secondary-side conduction period is an output current of the first output winding.

17. The secondary side post regulator according to the claim 11, wherein the secondary side synchronous rectification controller has a grounding terminal connected to an output terminal of the first output winding.

18. The secondary side post regulator according to the claim 17, further comprising:
   a buffer, through which the secondary side synchronous rectification controller drives the second rectifying switch.

\* \* \* \* \*